United States Patent
Seki et al.

(10) Patent No.: US 6,457,741 B2
(45) Date of Patent: *Oct. 1, 2002

(54) SEAT MOUNTED SIDE AIR BAG

(75) Inventors: Kazuhiro Seki; Takashi Aoki; Hiroyuki Maeda; Takashi Honda, all of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,893

(22) Filed: Aug. 12, 1998

(30) Foreign Application Priority Data

| Aug. 22, 1997 | (JP) | 9-226787 |
| Aug. 22, 1997 | (JP) | 9-226788 |
| Sep. 3, 1997 | (JP) | 9-237960 |

(51) Int. Cl.[7] .......................... B60R 21/22; B60R 21/28
(52) U.S. Cl. ................. 280/730.2; 280/739; 280/743.1
(58) Field of Search .................. 280/730.2, 730.1, 280/739, 743.1, 728.2; 297/216.13

(56) References Cited

U.S. PATENT DOCUMENTS

| 3,481,625 A | * | 12/1969 | Chute | 280/739 |
| 5,536,038 A | * | 7/1996 | Bollaert et al. | 280/730.2 |
| 5,632,506 A | * | 5/1997 | Shellabarger | 280/743.1 |
| 5,687,987 A | * | 11/1997 | Spencer et al. | 280/730.2 |
| 5,785,350 A | * | 7/1998 | Inoue et al. | 280/730.2 |
| 5,893,579 A | * | 4/1999 | Kimura et al. | 280/730.2 |
| 5,988,674 A | * | 11/1999 | Kimura et al. | 280/730.2 |
| 5,992,882 A | * | 11/1999 | Ito et al. | 280/743.1 |
| 6,045,151 A | * | 4/2000 | Wu | 280/730.2 |

FOREIGN PATENT DOCUMENTS

| JP | 3-108564 | 11/1991 |
| JP | 8-225054 | 9/1996 |

* cited by examiner

Primary Examiner—Peter C. English
(74) Attorney, Agent, or Firm—Armstrong, Westerman & Hattori, LLP

(57) ABSTRACT

An air bag, formed by sewing two basic fabrics at a sewing portion, is accommodated within a module case in a state in which the air bag has been fixed to a holder of an inflater at rear-side base portions and folded up into a bellows-like shape at a front-side foldable portions. The base portion of the left basic fabric, which is remote from a center pillar and a front door of a vehicle, has a section between two points b and c, which defines a surplus section. When the foldable portions of the air bag are expanded, the foldable portions can be moved toward an inner surface of a side of the vehicle body by the surplus section b and c and hence, the air bag can be deployed obliquely forwardly to reliably penetrate into a space between the center pillar, as well as the front door, and an occupant.

8 Claims, 15 Drawing Sheets

CROSS-SECTIONAL VIEW
TAKEN ALONG LINE X-X

CROSS-SECTIONAL VIEW
TAKEN ALONG LINE X-X

BEFORE SEWING

AFTER SEWING

BEFORE SEWING

AFTER SEWING

SEAT MOUNTED SIDE AIR BAG

BACKGROUND OF THE INVENTION

1. Field of the Invention

The present invention relates to an occupant protecting device designed so that an air bag, accommodated within a seat back, is deployed into a vehicle passenger compartment upon collision of a vehicle to protect an occupant.

2. Description of the Related Art

Such a system is known, for example, from Japanese Patent Application Laid-open No. 3-108564. In general, an occupant protecting device of such a type includes an air bag module which has a folded air bag and an inflater.

FIGS. 12A to 12C show a prior art method for folding up an air bag B. As shown in FIG. 12A, the air bag B in a deployed state has a vertical dimension $L_2$ larger than a vertical dimension $L_1$ of the inflater I, and a longitudinal dimension $L_3$ substantially equal to the vertical dimension $L_2$. To fold up the air bag B, upper and lower portions of the air bag B are first folded inwardly, as shown in FIG. 12B, so that the vertical dimension $L_2$ is near to the vertical dimension $L_1$. Then, the air bag B is longitudinally folded into a bellows-like shape, as shown in FIG. 12C, thereby forming a module wherein the inflater I is accommodated within the air bag B.

The air bag B folded up in the above-described manner is deployed in a straight forward direction of a vehicle body from a side of a seat back 2, as shown in FIG. 14. For this reason, there is a possibility that the air bag B cannot be smoothly deployed due to interference with a side and an arm of an occupant. To avoid such a problem, it is necessary to deploy the air bag B obliquely forwardly toward a center pillar 4 and a front door in order to permit the air bag B to properly penetrate into a space between the center pillar 4 as well as the front door 5 and the occupant.

FIGS. 13A to 13C show a course of deployment of the air bag B which has been folded up in the above-described prior art method. The air bag B is first deployed longitudinally as shown in FIG. 13A, and then vertically as shown in FIG. 13B to finally be in a completely deployed state shown in FIG. 13C. If the vertical deployment is performed behind the longitudinal deployment in the above-described manner, there is a problem that the side of the occupant cannot be held back at an initial stage of the deployment over a vertical wide range.

Further, such an occupant protecting device is known from Japanese Patent Application Laid-open No. 8-225054 (hereinafter "JP '054"), in which an air bag is formed by integrally sewing two left and right main basic fabrics with a single side basic fabric to connect outer peripheral edges of the two main basic fabrics to each other, and vent holes are defined in the side basic fabric corresponding to a front surface of the deployed air bag. By the fact that the vent holes are defined in the front surface of the air bag in the above described manner, the vent holes can be prevented from being occluded by a door and/or an occupant upon deployment of the air bag.

However, if the air bag is formed by sewing the three basic fabrics together as in the above-described known occupant protecting device of JP '054, the number of parts and the number of manufacturing steps are increased. Therefore, it is conceived that an air bag is formed from a single basic fabric. More specifically, an air bag 03 shown in FIG. 15B can be formed by double-folding a single basic fabric 01. cut into a substantially band-like shape at a central folding line 02, as shown in FIG. 15A, and sewing outer peripheral portions of the folded basic fabric 01 excluding the folding line 02 together. In this case, there is a problem that it is impossible to define vent holes 04, so that the vent holes 04 lie on a sewing portion 05. Therefore, the positions of the vent holes are deviated laterally from a front surface of the air bag 03 and as a result, when the air bag 03 has been expanded, the vent holes 04 are occluded by a door and/or an occupant.

SUMMARY OF THE INVENTION

Accordingly, it is a first object of the present invention to ensure that an air bag provided within a seat back is deployed obliquely forwardly, so that the air bag is permitted to reliably penetrate into a space between an occupant and an inner surface of a side of a vehicle body.

It is a second object of the present invention to provide an occupant protecting device designed so that an air bag accommodated within a seat back is deployed between an occupant and an inner surface of a side of a vehicle body upon collision of a vehicle, wherein the vertical deployment of the air bag is carried out promptly.

It is a third object of the present invention to ensure that an air bag functioning upon a side collision and including vent holes in its front surface is formed with a smaller number of parts.

To achieve the first object, according to a first aspect. and feature of the present invention, an occupant protecting device is provided which comprises: an air bag accommodated in a folded-up state within a seat back of a seat on which an occupant sits down, wherein when the air bag is expanded by a gas generated by an inflater, the air bag is deployed between the occupant and an inner surface of a side of a vehicle body, the air bag having a rear-side base portion fixed to a fixing member, and a front-side foldable portion folded up in a longitudinal direction, and the base portion having a surplus section provided thereon at a location remote from the inner surface of the side of the vehicle body for permitting the movement of the foldable portion toward the inner surface of the side of the vehicle body.

With the above-described arrangement, when the foldable portion of the air bag is expanded by the gas generated by the inflater, the foldable portion can be moved toward the inner surface of the side of the vehicle body by the surplus section provided on the base portion of the air bag at the location remote from the inner surface of the side of the vehicle body. Therefore, the air bag can be deployed obliquely forwardly to reliably penetrate into a space between the occupant and the inner surface of the side of the vehicle body.

In addition, to achieve the above-described first object, according to a second aspect and feature of the present invention, an occupant protecting device is provided which comprises: an air bag is accommodated in a folded-up state within a seat back of a seat on which an occupant sits down, wherein when the air bag is expanded by a gas generated by an inflater, the air bag is deployed into a space between the occupant and an inner surface of a side of a vehicle body, inner and outer (as viewed from inside of the vehicle body) portions of the air bag being folded up to form pleats, the number of the pleats on the inner portion being set smaller than the number of the pleats on the outer portion.

With the above-described arrangement, when the foldable portion of the air bag is expanded by the gas generated by the inflater, the inner portion (as viewed from inside of the vehicle body) of the air bag, having the smaller number of the pleats, is expanded earlier than the outer portion, having the larger number of the pleats. Hence, the inner portion (as viewed from inside of the vehicle body), which is expanded earlier, urges the outer portion in an outward direction of the vehicle body. As a result, the air bag can be deployed obliquely forwardly to reliably penetrate into the space between the occupant and the inner surface of the side of the vehicle body.

To achieve the second object of the present invention, according to a third aspect and feature of the, present invention, a process for folding up an air bag in an occupant protecting device which is designed so that the air bag, accommodated in a folded-up state within a seat back of a seat on which an occupant sits down, is expanded by a gas generated by an inflater, whereby the air bag is deployed between the occupant and an inner surface of a side of a vehicle body, the process comprising: a first step of folding the air bag into a bellows-like shape in a longitudinal direction of a vehicle body; and a second step of vertically folding at least one of upper and lower portions of the air bag folded in the bellows-like shape.

With the above-described feature, when the air bag is deployed by the gas generated by the inflater upon collision of a vehicle, at least one of the upper and lower portions of the air bag folded vertically at the second step is first deployed vertically, and then, the air bag folded in the longitudinal direction at the first step is deployed longitudinally. By deploying the air bag vertically and then longitudinally in the above manner, a side of an occupant can be held back at an initial stage of the deployment over a vertical wide range.

In addition to the third feature, if the vertical dimension of the inflater and the vertical dimension of the air bag folded at the second step are substantially equal to each other, the dimensions of the air bag in the folded-up state can be reduced to provide a compactness of an air bag module, while increasing the vertical dimension of the air bag to enable the side of the occupant to be held back over the wide range.

To achieve the third object, according to a fourth aspect and feature of the present invention, an occupant protecting device comprises: an air bag which is adapted to be expanded by a gas generated by an inflater upon side-collision of a vehicle, whereby the air bag is deployed from the inside of a seat back along an inner surface of a door in a forward direction of a vehicle body, the air bag having vent holes in its front surface, and the air bag being formed by sewing a single basic fabric at a location of the front surface of the air bag.

With the above-described arrangement, the air bag is formed by sewing the single basic fabric and therefore, the number of parts and the number of manufacturing steps can be suppressed to the minimum. In addition, the sewing portion lies at the location of the front surface of the air bag. Therefore, the vent holes can be provided in the front surface of the air bag without interference with the sewing portion, whereby the vent holes can be prevented from being occluded by a door and/or an occupant, when the air bag is deployed.

In addition to the fourth feature, if the air bag is formed by folding a band-like basic fabric in half at a folding line, and sewing outer peripheries of the folded fabric portions excluding the folding line, and the vent holes are defined to lie on the folding line, the shape of the basic fabric can be simplified, and the amount of the sewing operation can be suppressed to the minimum.

The above and other objects, features and advantages of the:present invention will become apparent from the following description of the preferred embodiments taken in conjunction with the accompanying drawings.

BRIEF DESCRIPTION OF THE DRAWINGS

FIGS. 1 to 10 show a first embodiment of the present invention, wherein:

FIG. 1 is a perspective view of a seat provided with an air bag device:

FIG. 2 is an enlarged cross-sectional view taken along line 2—2 of FIG. 1;

FIG. 3 is a view taken in the direction of arrow 3 of FIG. 2;

FIG. 4 is a cross-sectional view taken along line 4—4 of FIG. 3;

FIGS. 5A to 7B are views for explaining the order of folding-up of the air bag;

FIG. 8 is an enlarged view of an essential portion shown in FIG. 5A;

FIG. 10 is a plan view for explaining the operation during deployment of the air bag.

FIGS. 12A to 15B show a prior art occupant protecting device, wherein:

FIGS. 12A to 12C are views for explaining a prior art process for folding up an air bag;

FIG. 14 is a view for explaining the operation when the air bag is deployed; and FIGS. 15A and 15B are illustrations showing steps of manufacturing the air bag.

DETAILED DESCRIPTION OF THE PREFERRED EMBODIMENTS

The present invention will now be described by way of embodiments with reference to the accompanying drawing figures.

Figure 1:
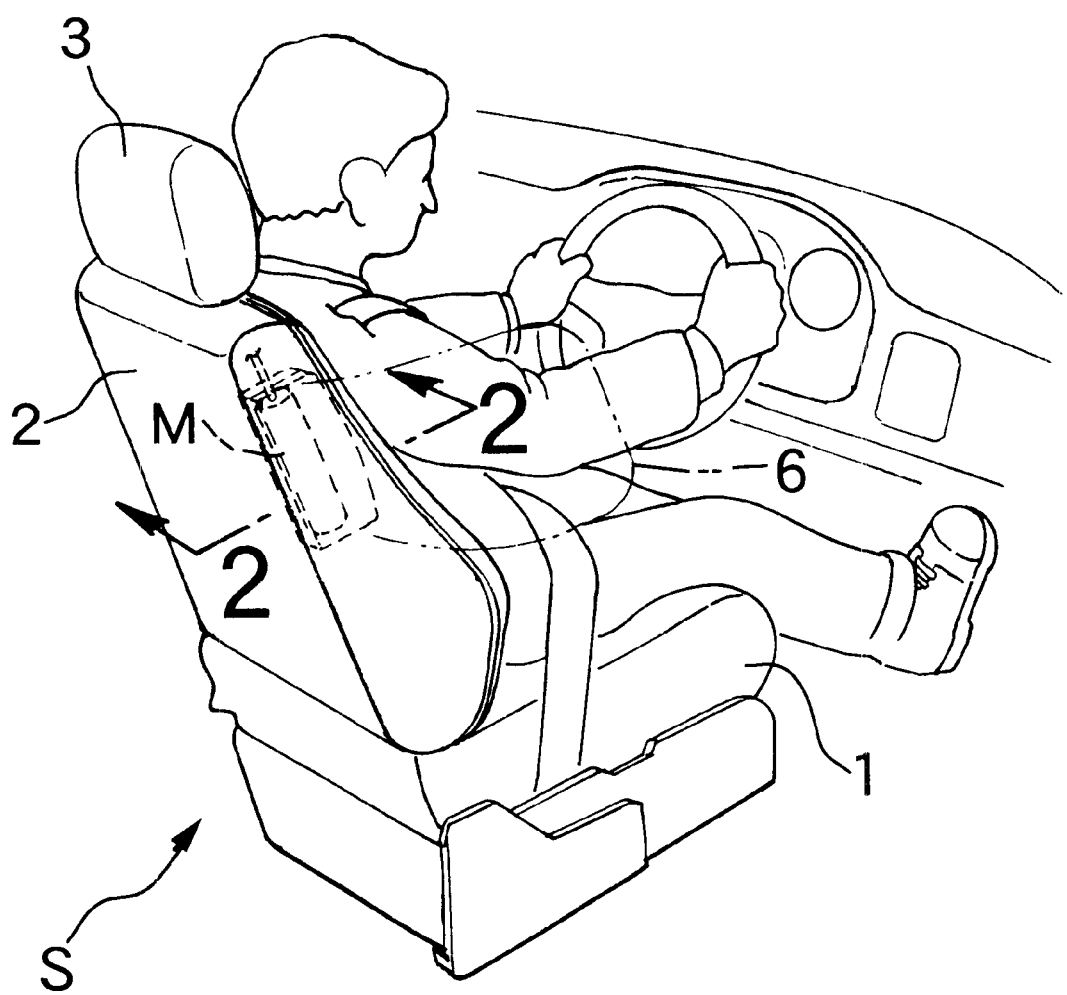
Figure 9A:
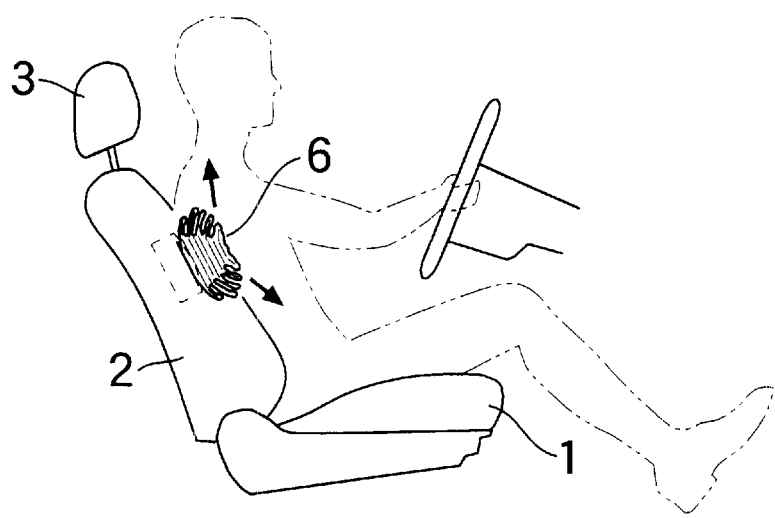
FIGS. 9A to 9C are side views for explaining the operation during deployment of the air bag.
Figure 9B:
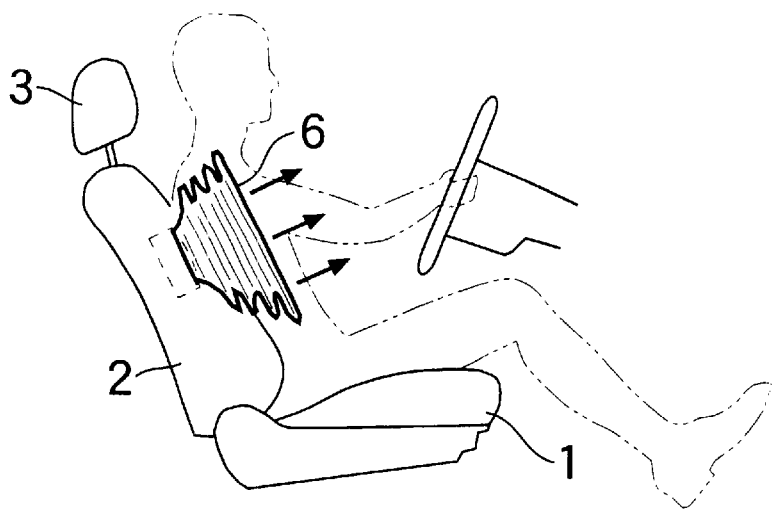
Figure 9C:
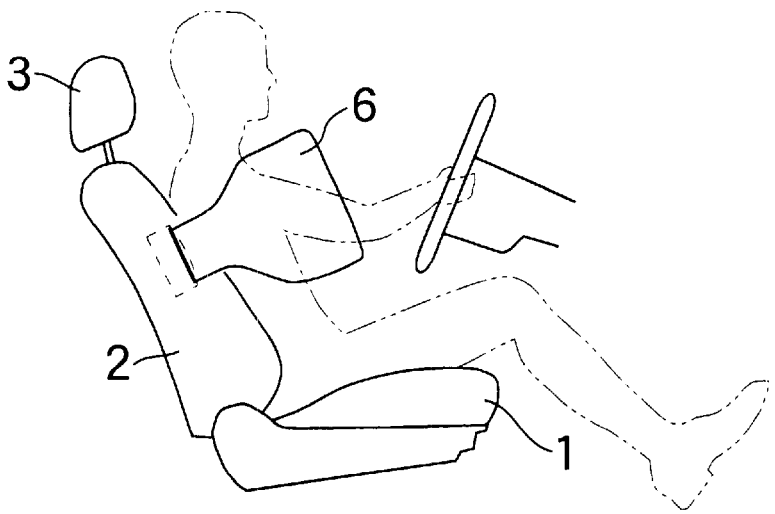

As shown in FIGS. 1 and 9C, a right front seat S in an automobile comprises: a seat cushion 1 disposed substantially horizontally; a seat back 2 extending rearwardly and upwardly from a rear end of the seat cushion 1; and a head rest 3 mounted at an upper end of the seat back 2. As shown in FIG. 20, a center pillar 4 faces a right side of the seat back 2, and a front door 5 is disposed in front of the center pillar 4. An air bag module M is accommodated in the inside of a right portion of the seat back 2. Upon operation of the air bag module M, the air bag 6 breaks and forces a sewn portion of the seat back 2 open, so that the air bag 6 is deployed laterally and forwardly to block a right side of an occupant sitting on the seat S and left sides of the center pillar 4 and the front door 5 therebetween.

Figure 2:
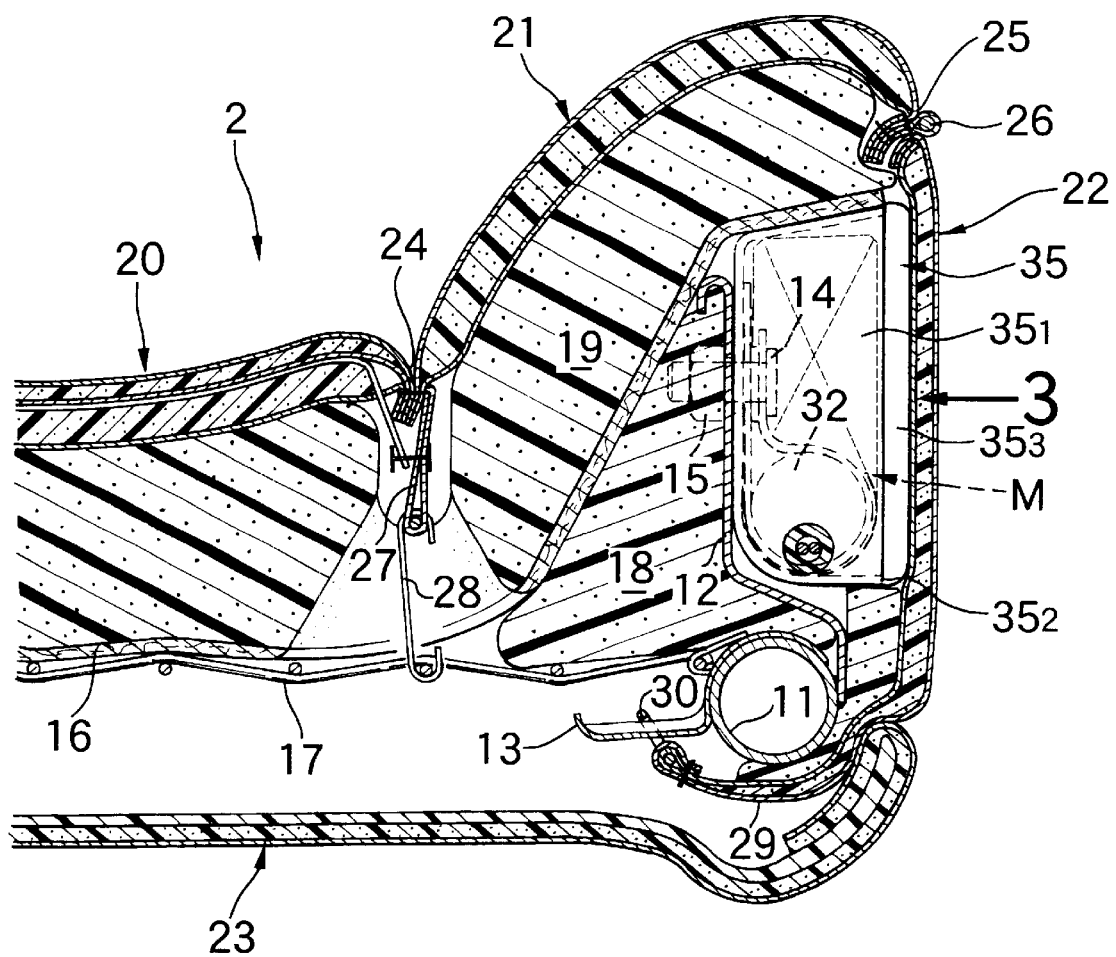

Two things which can be seen from FIG. 2 are as follows: (1) an air bag module mounting bracket 12 made of a metal and extending forwardly of a vehicle body; and (2) a retainer 13 made of a metal and extending inwardly of the vehicle body. Both the air bag mounting module bracket 12 and the retainer 13 are fixed, by welding, to a pipe frame 11 extending vertically along a right edge of the seat back 2. The air bag module M is fixed to a right side of the air bag module mounting bracket 12 by two bolts 14, 14 and two nuts 15, 15. A shape retaining member 16 made of, a coarse blanket extends in a leftward direction of the vehicle body from a front surface of the air bag module M through a thickness-wise intermediate portion of the seat back 2, and is connected to a pipe frame (not shown) at a left side of the vehicle body. A mesh-like spring 17 is stretched on an inner periphery of the pipe frame 11, and a pad 18, formed of a sponge, is mounted on a portion which is surrounded by a front surface of the spring 17, a rear surface of the shape retaining member 16, and a rear surface of the air bag module mounting bracket 12. A pad 19, similarly formed of a sponge, is mounted on a front surface of the shape retaining member 16.

A central portion of a front surface of, the seat back 2 is covered with a first covering member 20, and left and right opposite sides and an upper portion of the first covering member 20 are covered with a second covering member 21. The left and right opposite sides and an upper surface of the seat back 2 connected to the second covering member 21 are covered with a third covering member 22 and further, a rear surface of the seat back 2 is covered with a fourth covering member 23. The first and second covering members 20 and 21 are sewn together at a sewing portion 24, and the second and third covering members 22 are also sewn together at a sewing portion 25. A bead 26 is integrally formed at sewing portion 25 by sewing. A clip 28 is provided at a tip end of a tongue piece 27 extending from the sewing portion 24, so that the first and second covering members 20 and 21 are retained in a predetermined shape by bringing the clip 28 into engagement with the spring 17. A clip 30 is also provided at a tip end of a tongue piece 29 extending from a rear end of the third covering member 22 so that the third covering member 22 is fixed by bringing the clip 30 into engagement with the retainer 13.

Figure 3:
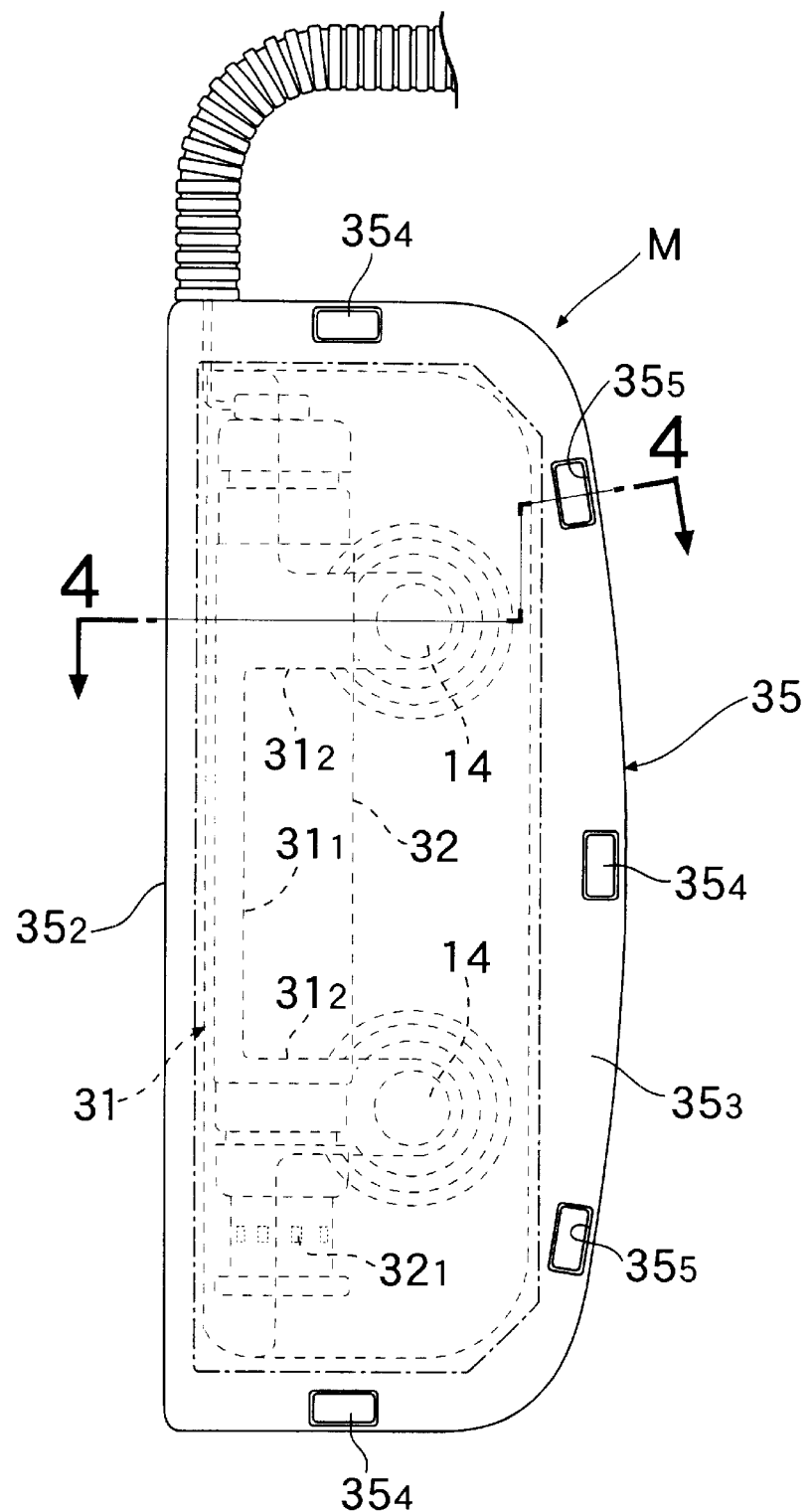

The structure of the air bag module M will be further described with reference to FIGS. 2 to 4. A holder 31 made of a metal includes a body portion $31_1$ having a J-shaped section, and a pair of clamp portions $31_2$, $31_2$. extending from one edge of the body portion $31_1$. A substantially cylindrical inflater 32 filled with a propellant is supported at a circular section defined by the body portion $31_1$ and the clamp portions $31_2$, $31_2$. The holder 31 and the inflater 32 are wrapped in a rear portion of the folded-up air bag 6. The bolts 14, 14 are passed through the clamp portions $31_2$, $31_2$ and the body portion $31_1$ of the holder 31 and through side plates 33 and tightened by nuts 34, 34, and are further passed through the air bag module mounting bracket 12 and tightened by nuts 15, 15. A plurality of gas ejection bores $32_1$ are defined at a lower portion of the inflater 32 (see FIG. 3).

The holder 31, the side plate 33, the inflater 32 and the folded-up air bag 6 are accommodated within a module case 35 integrally formed of a synthetic resin. The module case 35 includes a tray-like body portion $35_1$ which opens toward the right side of the vehicle body, and a lid portion $35_3$ connected to a rear edge of the body portion $35_1$ through a hinge portion $35_2$. The lid portion $35_3$ is fixed to cover an opening of the body portion $35_1$ by bringing all of five locking claws $35_4$, provided at an upper edge, a front edge, and a lower edge of the body portion $35_1$ into engagement with five locking bores $35_5$, provided, in an upper edge, a front edge, and a lower edge of the lid portion $35_3$, respectively.

Figure 5A:
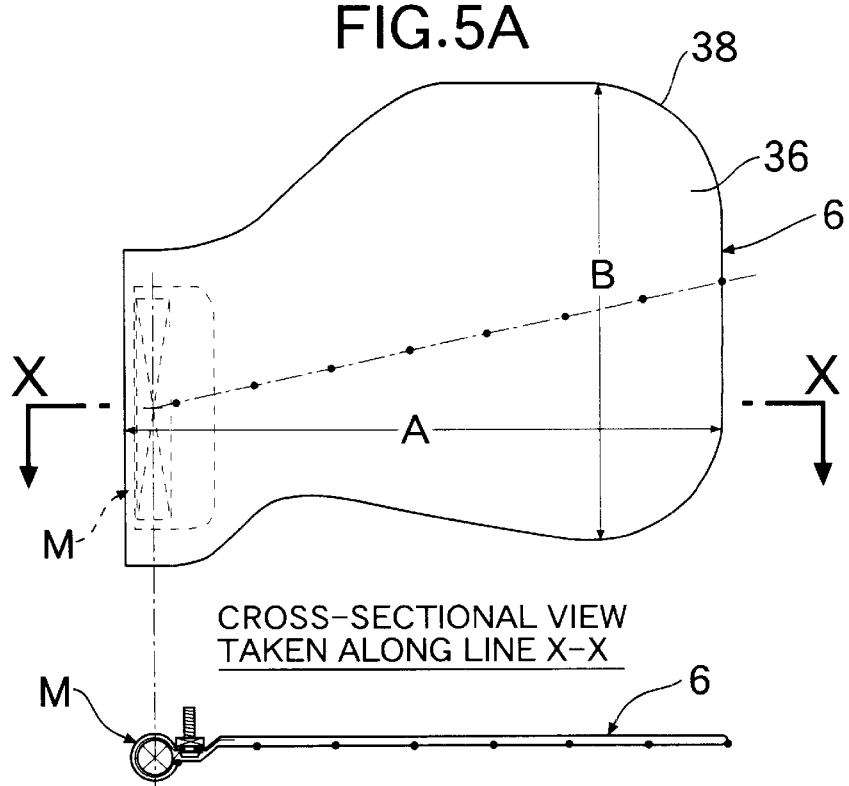
Figure 10:
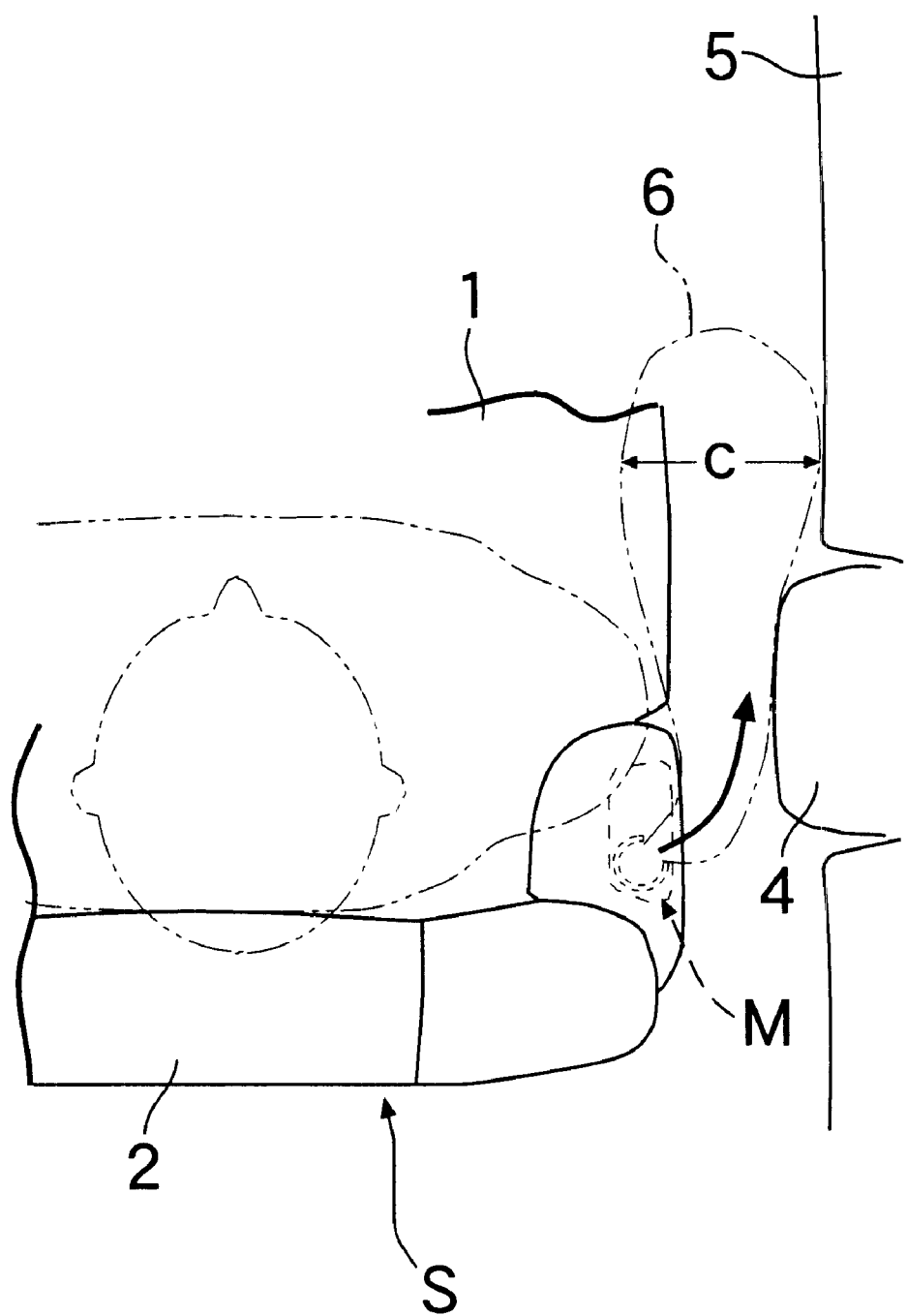

As shown in FIGS. 5A and 10, the shape of the deployed air bag 6 is such that the longitudinal dimension A is largest; the vertical dimension B is slightly smaller than the longitudinal dimension A, and the lateral dimension C is remarkably smaller than the longitudinal and vertical dimensions A and B. The vertical dimension B of the air bag which has been deployed is substantially twice as large as the vertical dimension D. (see FIG. 7A) of the air bag 6 which has been folded up.

The procedure for folding up the air bag 6 will be described with reference to FIGS. 4 to 8.

Figure 4:
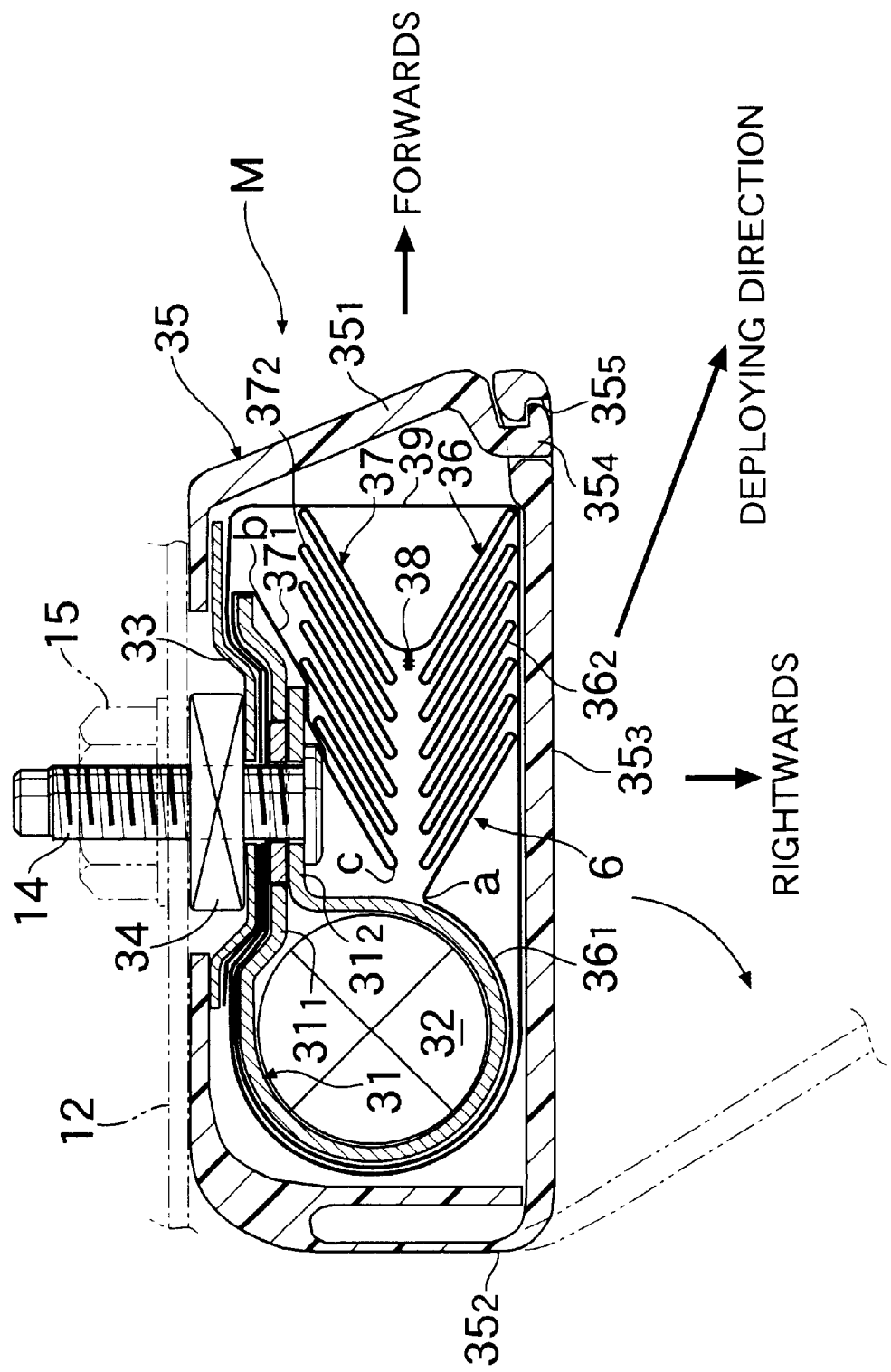

As shown in FIGS. 4 and 5A, the air bag 6 before being folded up is formed into a flat pouch-like shape made by sewing two basic fabrics 36 and 37 together at a sewing portion 38 provided around an outer periphery, and the holder 31 and the inflater 32 are fixed so that they are wrapped in the base portions $36_1$ and $37_1$ (rear portions) of the basic fabrics. This will be further described with reference to FIGS. 4 and 8. The base portions $36_1$ and $37_1$ of the two basic fabrics 36 and 37 are tightened and fixed by the bolts 14, 14 passed there through in states in which they are sandwiched between the body portion $31_1$ of the holder 31 and the side plate 33. The base portion $36_1$ of the basic fabric 36, located at an outer side in a lateral direction of the vehicle body, extends forwardly to a point a in a state in which it wraps the outer periphery of the inflater 32 over substantially 360°, and a foldable portion $36_2$, located in front of the point a, is folded up in a manner which will be described hereinafter. The base portion $37_1$ of the basic fabric 37, located at an inner side in the lateral direction of the vehicle body, extends rearwardly around a portion b at a front end of the body portion $31_1$ of the holder 31; folded back forwardly at a point c in front of the inflater 32 and then, a foldable portion $37_2$ located in front of the point c is folded up in a manner which will be described hereinafter.

Figure 5B:
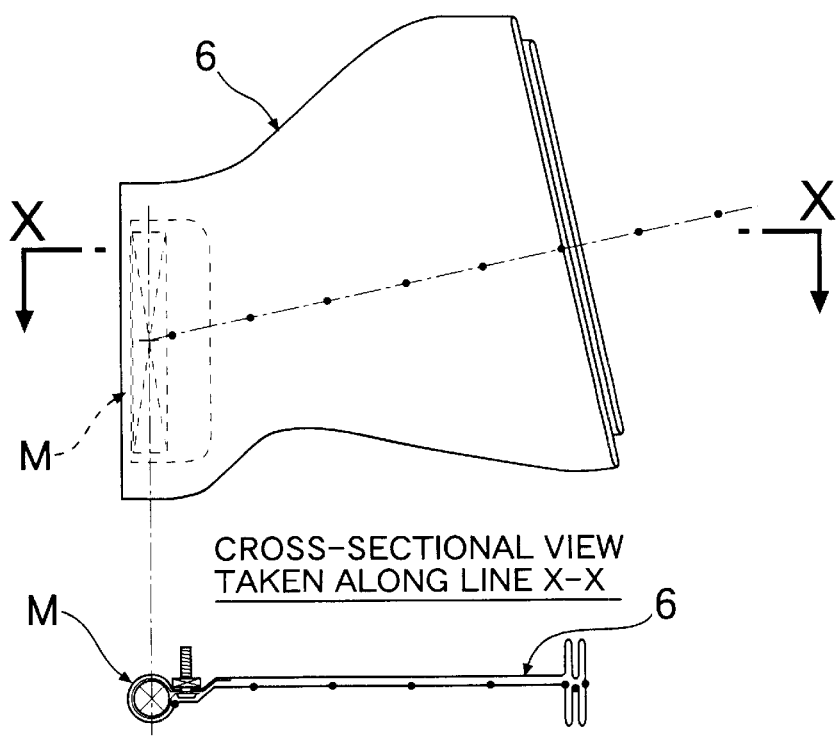
Figure 6A:
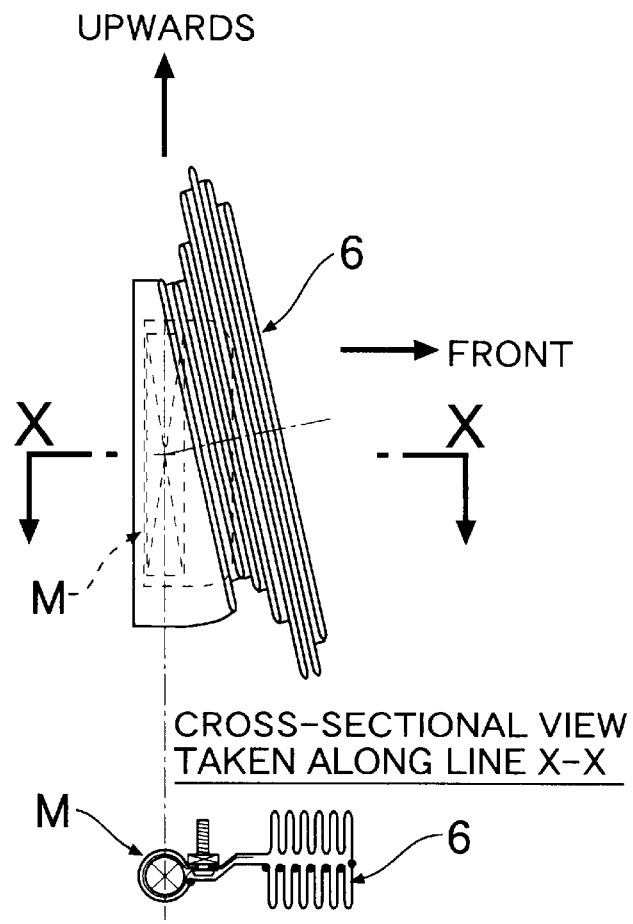
Figure 6B:
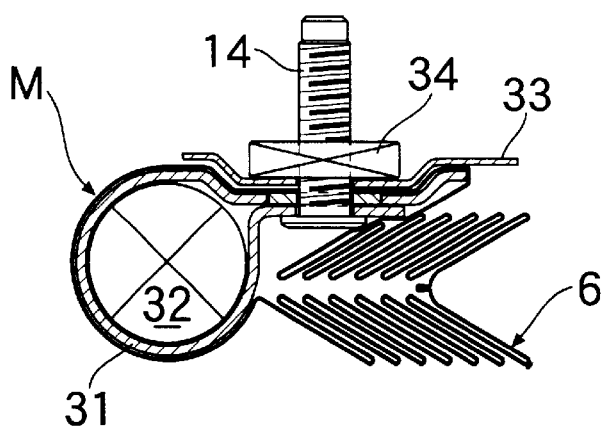
Figure 7A:
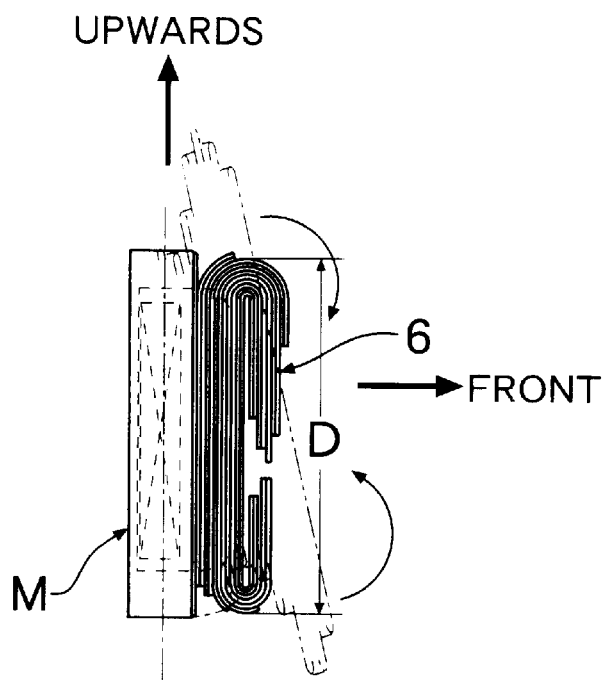

The foldable portions $36_2$ and $37_2$ of the air bag 6 spread into a state shown in FIG. 5A are folded up into a bellows-like shape from its front side toward its rear side, as shown in FIGS. 5B and 6A. Then, laterally opposite halves of the folded-up air bag 6 are crushed so that they fall down forwardly to decrease the lateral width, as shown in FIG. 6B. Subsequently, the upper and lower portions of the folded-up air bag 6 are folded back into downwardly-turned and upwardly-turned attitudes, respectively, to decrease the vertical height, as shown in FIG. 7A.

Figure 7B:
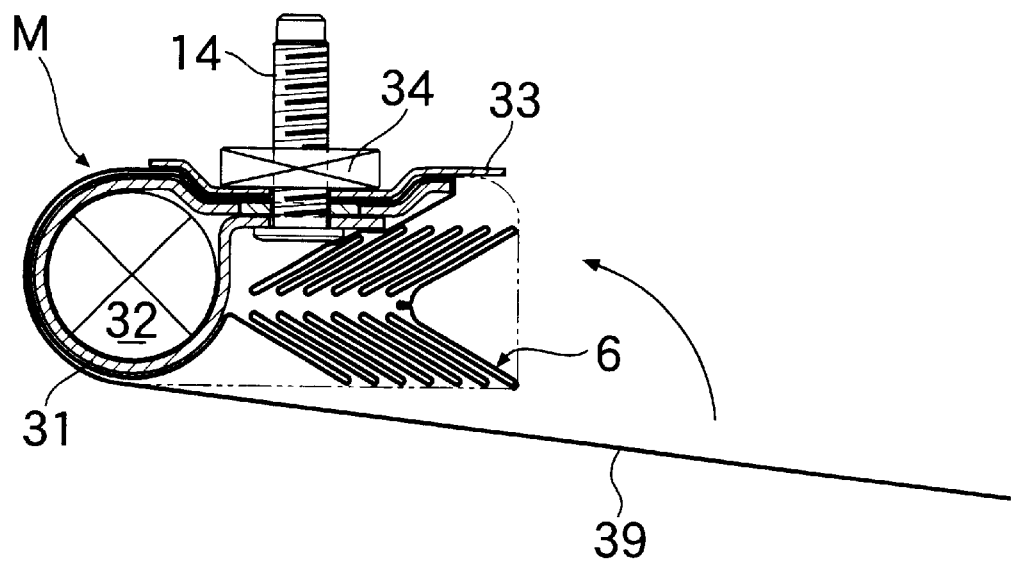
Figure 8:
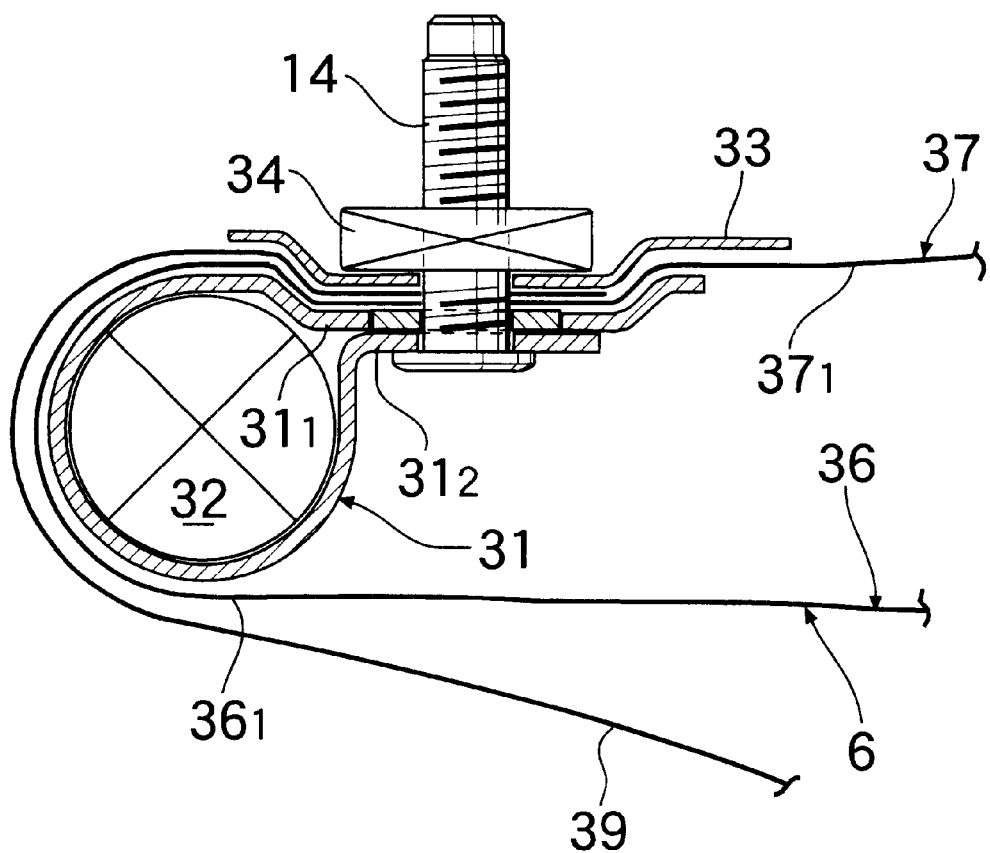

A protecting cover 39, made of a fabric piece wrapping the folded-up air bag 6, is fixed at its opposite ends in a state in which it is sandwiched between the body portion $31_1$ of the holder 31 and the side plate 33, as shown in FIG. 7B. The air bag 6, after completion of the folding procedure, is wrapped by the protecting cover 39 in a compact manner, so that it is prevented from being broken up relative to all of the inflater 32, the holder 31 and the side cover 33. When the air bag 6 has been inflated, the protecting cover 39 is easily broken and hence, the inflation of the air bag 6 cannot be obstructed.

The operation of the first embodiment of the present invention having the above-described arrangement will be described below.

When the inflater 32 generates a gas upon collision of the vehicle, the air bag 6 is expanded within the module case 35. When the pressure of the expansion of the air bag 6 is applied to the lid portion $35_3$ of the module case 35, the locking claws $35_4$ are disengaged from the locking bores $35_5$, permitting the lid portion $35_3$ to be rotated about the hinge portion $35_2$ (see dashed lines in FIG. 4), whereby the body portion 35₁ is opened. When the pressure of the opening of the lid portion 35₃ is transmitted to the third covering member 22 of the seat back 2 in FIG. 2, the sewing portion 25 is broken to separate the second and third covering members 21 and 22, and the air bag 6, passed through a resulting clearance, is deployed obliquely forwardly along the center pillar 4 and the front door 5 (see FIG. 10).

At the start of the expansion of the air bag 6, if the air bag 6 is inflated laterally outwardly rather than straight forwards, i.e., obliquely forwardly toward the center pillar 4 and the front door 5, the opening of the module case 35 and the breaking of the sewing portion 25 can be properly performed, thereby accurately deploying the air bag 6 between an occupant and the center pillar 4 as well as the front door 5.

For this purpose, a section from the point c to the point b, in the base portion 37₁ of the basic fabric 37 located at the laterally inner side of the air bag 6, is disposed as a surplus section b-c along the right side of the body portion 31₁ of the holder 31, as shown in FIG. 4. Therefore, when the air bag 6 is inflated, the surplus section b-c of the laterally inner basic fabric 37 is rotated in a counterclockwise direction about the point b, whereby the air bag 6 can be freely moved rightwardly (i.e., laterally outwardly). Thus, the air bag 6 can be smoothly deployed obliquely and rightwardly without interfering with a right side and a right arm of the occupant.

As can be seen from FIG. 4, bellows-like pleats are formed on the folded-up air bag 6 at its inner and outer portions as viewed from inside of the vehicle body. The number of the pleats on the inner portion as viewed from inside of the vehicle body is six, and the number of the pleats on the outer portion as viewed from inside of the vehicle body is seven. Thus, the number of the pleats on the inner portion as viewed from inside of the vehicle body is set smaller than the number of the pleats on the outer portion as viewed from inside of the vehicle body. The smaller the number of the pleats, the more the folded-up air bag 6 can be inflated smoothly and hence, the inner portion of the air bag having the smaller number of the pleats is inflated earlier than the outer portion of the air bag having the larger number of the pleats. As a result, the outer portion pushed by the inner portion inflated earlier is moved obliquely in the laterally outward direction of the vehicle body, whereby the air bag 6 can be inflated smoothly toward the inside of a vehicle compartment without interfering with the right side of the right arm of the occupant.

As can be seen from FIGS. 9A to 9c, when the air bag 6 is deployed while breaking the sewing portion 25 of the seat bag 2, the air bag 6 is first deployed vertically as shown in FIG. 9A and then forwardly as shown in FIG. 9B, and thus, finally reaches a completely deployed state shown in FIG. 9C. By performing the vertical deployment of the air bag preferentially to the longitudinal deployment in the above-described manner, the side of the occupant can be covered immediately over a wide vertical range, whereby the occupant can be reliably held back. To realize this, when the air bag 6 is to be folded up, the vertical folding of the air bag 6 is first carried out (see FIGS. 5A and 6A) and then, the longitudinal folding of the air bag 6 is carried out (see FIG. 7). Thus, the air bag 6 is deployed first vertically and then longitudinally. Therefore, the deployments in the above-described order are possible.

Figure 11A:
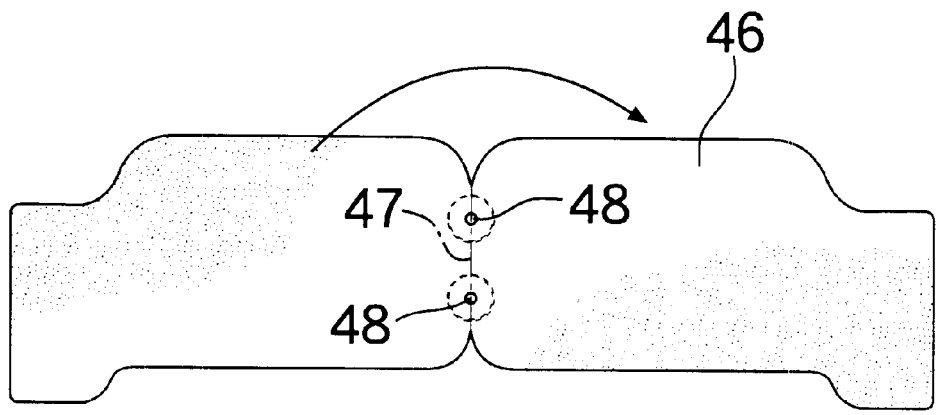
FIGS. 11A and 11B are illustrations showing steps of manufacturing an air bag in an occupant protecting device according to a second embodiment of the present invention.
Figure 11B:
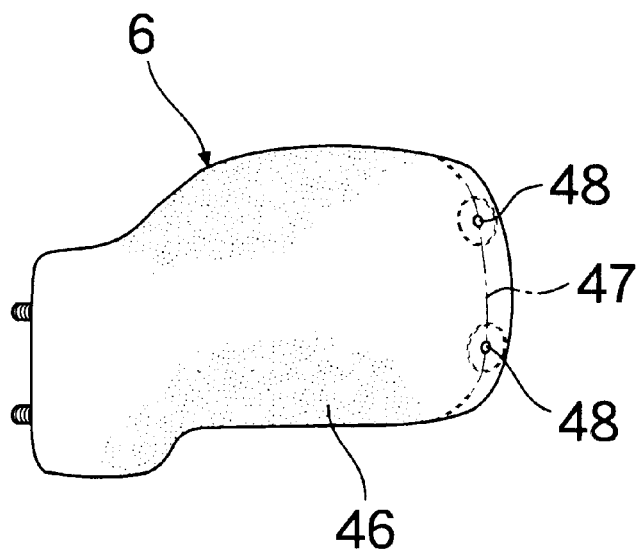
Figure 12A:
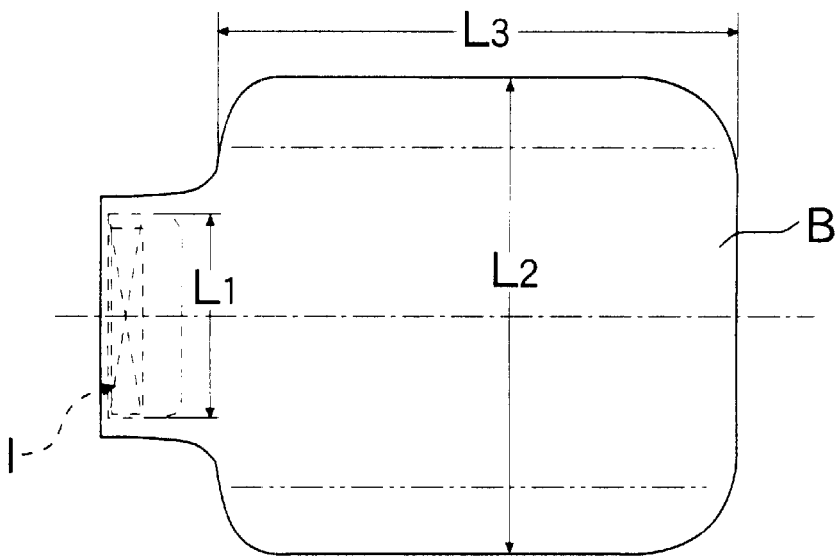
Figure 12B:
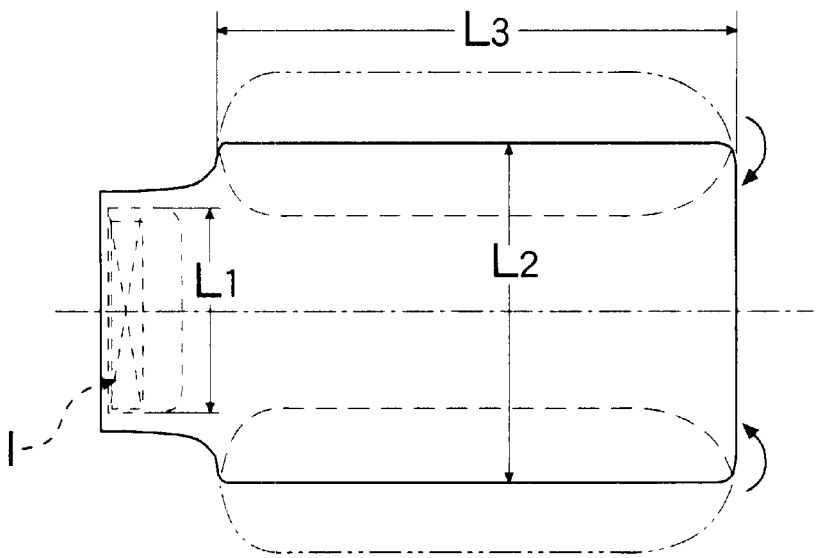
Figure 12C:
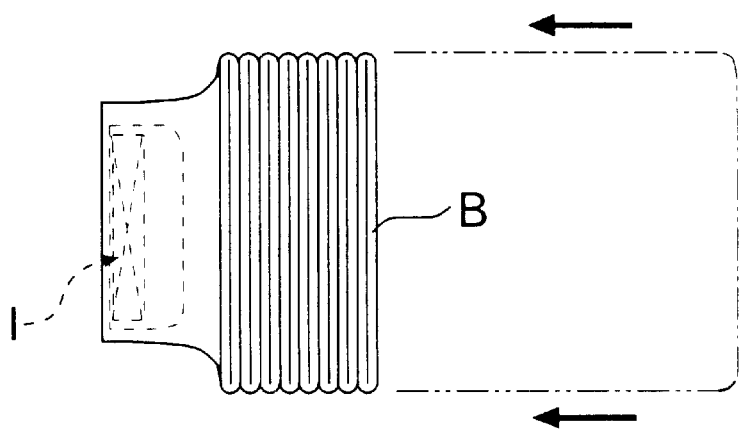
Figure 13A:
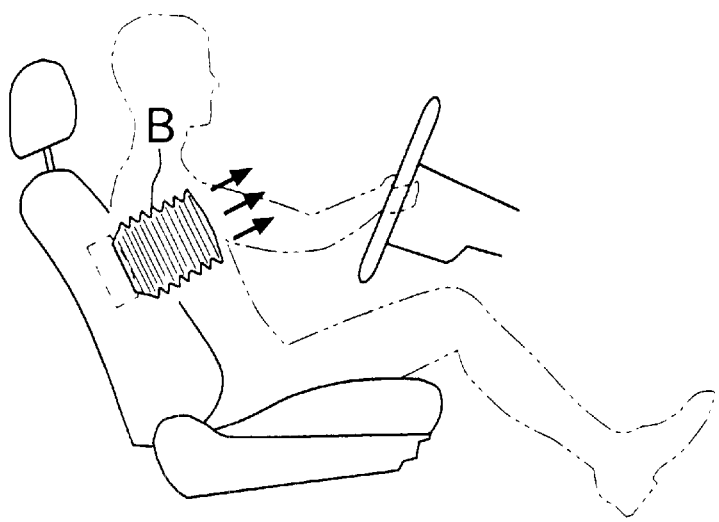
FIGS. 13A to 13C are illustrations for explaining the operation when the air bag is deployed.
Figure 13B:
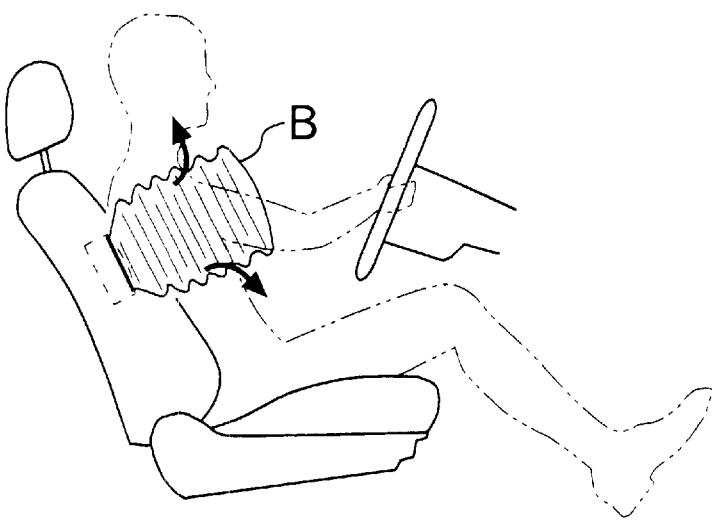
Figure 13C:
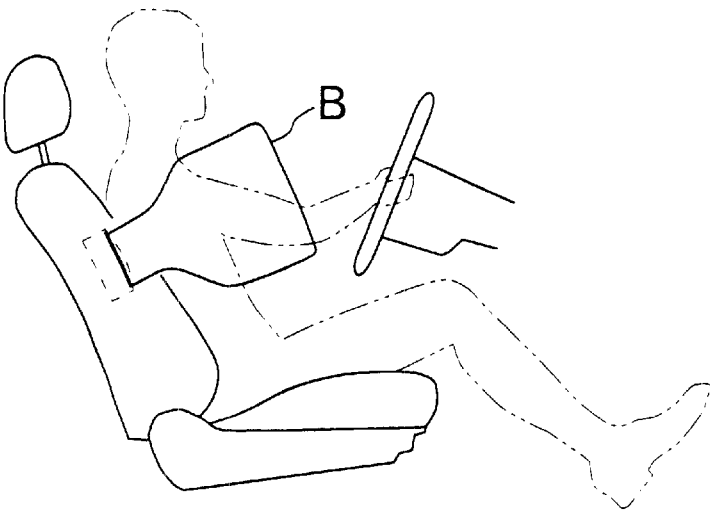
Figure 14:
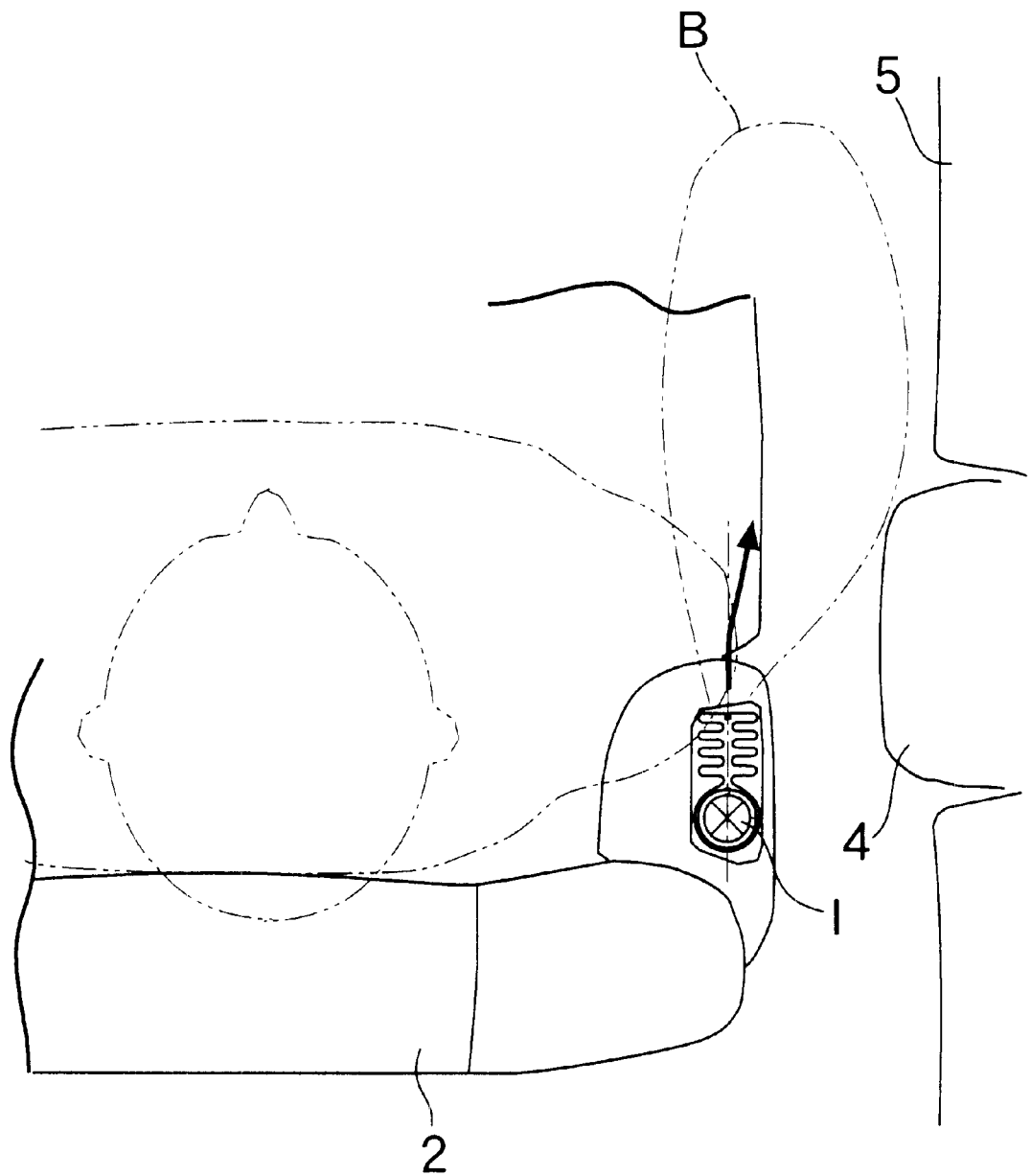
Figure 15A:
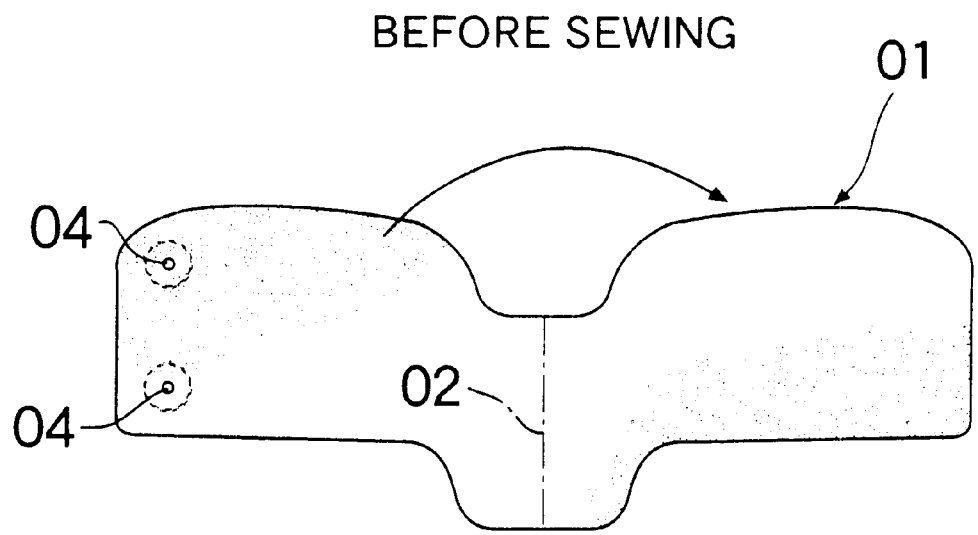
Figure 15B:
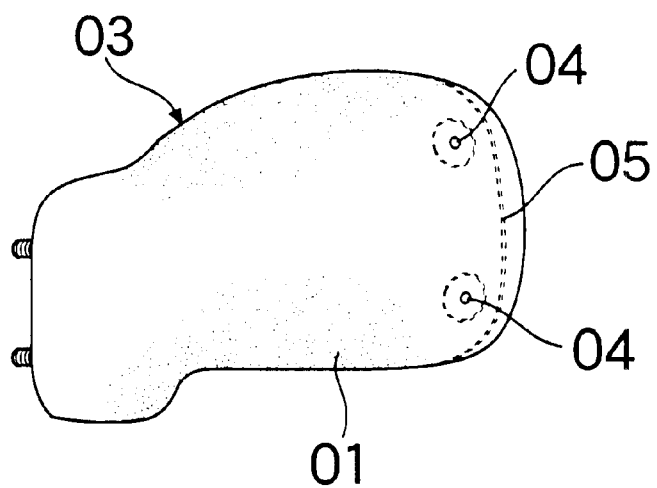

A second embodiment of the present invention will be described with reference to FIGS. 11A and 11B.

The second embodiment has a feature in the structure of an air bag 6, and another arrangement is the same as in the above-described first embodiment. More specifically, the air bag 6 is finished into a pouch-like shape by folding in half one basic fabric 46 which has been cut into a substantially band-like shape from a central folding line 47, by superimposing the resulting folded fabric portions and by sewing outer peripheries of the folded fabric portions excluding the folding line 47. At this time, an inflater 32 is accommodated in an end of the air bag 6 opposite from the folding line 47. Two vent holes 48, 48 are defined to lie on the folding line 47 in the basic fabric 46 and located at positions at a tip end (i.e., in a front surface) of the air bag 6 which is in its deployed state.

When the inflation of the air bag 6 is completed upon collision of the vehicle, a surplus amount of a gas is discharged through the vent holes 48, 48, but the vent holes 48, 48 cannot be occluded by the door 5 (see FIG. 10) or an occupant, because they are defined in the front surface of the air bag 6, whereby the function of the vent holes 48, 48 can be reliably exhibited. In addition, since the air bag 6 is formed;by folding in half the basic fabric 46 which has been cut into the band-like: shape and then by sewing the outer peripheries excluding the folding line 47, the number of parts can be reduced, and the amount of the sewing work can be kept to a minimum, as compared with the air bag formed by sewing a plurality of basic fabrics together. Moreover, the sewing portion is provided at a location out of the front surface of the air bag 6 and hence, the vent holes 48, 48 can be provided in the front surface of the air bag 6.

Although the embodiments of the present invention have been described in detail, it will be understood that the present invention is not limited to the above-described embodiments, and various modifications in design may be made without departing from the spirit and scope of the invention defined in claims.

For example, the method, for folding the foldable portions 36₂ and 37₂ of the basic fabrics 36 and 37, respectively, of the air bag 6, is not limited to the above-described method. Although the inflater 32 has been accommodated within the air bag 6, to constitute the air bag module M in the embodiments, the present invention is also applicable to an occupant protecting device including an air bag 6 and inflater 32 which are disposed at spaced-apart locations. In addition, both of the upper and lower portions of the air bag 6 have been folded vertically in the second step in the embodiment, but only one or the other of the upper and lower portions of the air bag 6 may be folded.

What is claimed is:

1. An occupant protection device, comprising:
   a seat back for a vehicle, said vehicle having a body having sides;
   an air bag module located within said seat back and positioned in a portion of said seat back toward the nearest side of the vehicle body to said portion, said air bag module comprising:
   an inflater;
   a holder for the inflater; and
   an air bag made of fabric mounted in the module adjacent to the inflater, said air bag comprising a surplus section and being folded into a bellows shape with a first foldable portion, a second foldable portion and a connection portion where the fabric of the first foldable portion connects to the fabric of the second foldable portion; wherein
   said first foldable portion comprises a first number of pleats of fabric;

said second foldable portion comprises a second number of pleats of fabric; and said connection portion is located between the pleat farthest from the inflater of the first foldable portion and the pleat farthest from the inflater of the second foldable portion, and said surplus section extends rearwardly around a front end of said holder and is folded back forwardly in front of said inflater and is connected to said first foldable portion.

2. The occupant protection device of claim 1, wherein:

said second foldable portion is positioned toward said nearest side of the vehicle body and said first foldable portion is positioned inboard of said second foldable portion.

3. The occupant protection device of claim 2, said first foldable portion having six pleats of fabric and said second foldable portion having seven pleats of fabric, as viewed from the inside of the vehicle.

4. The occupant protection device of claim 1, wherein:

said air bag, when deployed, has a longitudinal dimension longer than a vertical dimension and a vertical dimension longer than a lateral dimension.

5. The occupant protection device of claim 1, said connection portion having a vent hole for venting gas during inflation of the air bag.

6. The occupant protection device of claim 5, said connection portion having two vent holes for venting gas during inflation of the air bag.

7. The occupant protection device of claim 5, said connection portion comprising a folding line, said vent hole for venting gas during inflation of the air bag lying on the folding line.

8. The occupant protection device of claim 7, said connection portion having two vent holes on the folding line.

* * * * *